US 7,050,078 B2

(12) United States Patent
Dempski

(10) Patent No.: US 7,050,078 B2
(45) Date of Patent: May 23, 2006

(54) ARBITRARY OBJECT TRACKING AUGMENTED REALITY APPLICATIONS

(75) Inventor: Kelly L. Dempski, Evanston, IL (US)

(73) Assignee: Accenture Global Services GmbH (CH)

(*) Notice: Subject to any disclaimer, the term of this patent is extended or adjusted under 35 U.S.C. 154(b) by 391 days.

(21) Appl. No.: 10/326,158

(22) Filed: Dec. 19, 2002

(65) Prior Publication Data

US 2004/0119662 A1   Jun. 24, 2004

(51) Int. Cl.
*G09G 5/00* (2006.01)
(52) U.S. Cl. .............................. 345/700; 345/7; 345/8; 345/9
(58) Field of Classification Search ................ 345/7–9, 345/420, 435, 473, 700; 382/103, 154, 284; 364/514
See application file for complete search history.

(56) References Cited

U.S. PATENT DOCUMENTS

| | | | |
|---|---|---|---|
| 5,850,352 A * | 12/1998 | Moezzi et al. ............... 345/419 |
| 6,023,523 A | 2/2000 | Cohen et al. |
| 6,028,955 A | 2/2000 | Cohen et al. |
| 6,061,064 A * | 5/2000 | Reichlen ...................... 345/418 |
| 6,064,749 A * | 5/2000 | Hirota et al. ................ 382/103 |
| 6,091,378 A * | 7/2000 | Richardson et al. ........... 345/7 |
| 6,124,864 A * | 9/2000 | Madden et al. .............. 345/473 |
| 6,222,937 B1 * | 4/2001 | Cohen et al. ................ 382/154 |
| 6,317,127 B1 * | 11/2001 | Daily et al. .................. 345/629 |
| 6,396,961 B1 | 5/2002 | Wixson et al. |
| 6,798,443 B1 * | 9/2004 | Maguire, Jr. ................ 348/121 |
| 6,847,336 B1 * | 1/2005 | Lemelson et al. ............. 345/8 |
| 6,867,753 B1 * | 3/2005 | Chinthammit et al. ......... 345/8 |
| 6,919,892 B1 * | 7/2005 | Cheiky et al. .............. 345/473 |
| 6,983,082 B1 * | 1/2006 | Duiker ........................ 382/284 |
| 2002/0101510 A1 | 8/2002 | Basson et al. |
| 2004/0131232 A1 * | 7/2004 | Meisner et al. ............. 382/103 |
| 2004/0169620 A1 * | 9/2004 | Baram ............................ 345/8 |

(Continued)

FOREIGN PATENT DOCUMENTS

EP    0 537 945 A1    4/1993
EP    0 873 653 B1    8/2002

OTHER PUBLICATIONS

S. Makil, "Robust Registration of Virtual Objects for Real-Time Augmented Reality", The Ottawa-Carleton Institute of Computer Science School of Computer Science Carleton University, Ottawa, Ontario, Canada, May 8, 2002.

(Continued)

*Primary Examiner*—Vijay Shankar
*Assistant Examiner*—Prabodh Dharia
(74) *Attorney, Agent, or Firm*—Brinks Hofer Gilson & Lione

(57) ABSTRACT

Video images of objects in a real-world environment are taken from the perspective of a viewer. The user's field of view may be captured in the video images that are processed to select a segment of the video image or an object depicted in the video image. An image such as a computer-generated annotation or graphic overlay way be registered to the segment, and therefore track the segment from the user's field of view of the segment, without prior knowledge of the spatial relationship of the segment to the real-world environment according to a centroid for an interframe difference of the video image associated with the selected object. The image may be displayed in the user's field of view or in the video image. The computer-generated image tracks the movement of the segment with respect to the video image.

38 Claims, 4 Drawing Sheets

U.S. PATENT DOCUMENTS

2004/0183751 A1* 9/2004 Dempski ........................ 345/8
2005/0083248 A1* 4/2005 Biocca et al. .................. 345/8

OTHER PUBLICATIONS

S. Malik, G. Roth. C. McDonald, "Robust 2D Tracking for Real-Time Augmented Reality", In Proceedings of The 15th International Conference on Vision Interface May 27-29, 2002, Calgary, Canada.

Ulrich Neumann, Suya You, Youngkwan Cho, Jongweon Lee, Jun Park, "Augmented Reality Tracking in Natural Environments", International Symposium on Mixed Realities, pp. 1-24, 1999, Tokyo, Japan.

Ulrich Neumann and Youngkwan Cho, "A Self-Tracking Augmented Reality System" ACM International Symposium on Virtual Reality and Applications, pp. 109-115, Jul. 1996.

* cited by examiner

ARBITRARY OBJECT TRACKING AUGMENTED REALITY APPLICATIONS

BACKGROUND

1. Field of the Invention

The present invention relates generally to interactive viewing systems. In particular, the present invention relates to tracking an arbitrary object in an augmented reality viewing system.

2. Description of the Related Art

Interactive viewing systems have found application in manufacturing automation and maintenance, surgical procedures, educational instruction, mechanical, architectural, and interior designs, multimedia presentations, and motion picture production. Such interactive viewing systems may display computer-generated overlay images, such as a rendering of annotations, blueprints, component parts, buildings, backgrounds, and other images, in a user's field-of-view of a real-world environment to provide information about the real-world objects.

One type of interactive viewing system is referred to as an augmented reality (AR) system. In an AR system, computer-generated images, or virtual images, may be embedded in or merged with the user's view of the real-world environment to enhance the user's interaction with, or perception of, the environment. The user's view of the environment may be captured in a video image of the environment, and displayed to the viewer with embedded computer-generated images. Similarly, the computer-generated images may be projected on a see-through screen positioned in the user's field of view of the environment or displayed as an overlay in the user's actual field of view of the environment. The computer-generated images provide a visual enhancement, such as two-dimensional overlays and three-dimensional models, of real-world objects. The computer-generated images may include a text annotation describing an object, instructions for operation of a device, a schematic of an item, or a map linked to objects in the user's field of view.

In a conventional AR system, a user views the environment through a head mounted display (HMD), which may include a camera for capturing video images of the environment, and a display for projecting those video images with computer-generated virtual images. The HMD may also be configured as a see-through device, which allows the user to view the environment and on which computer-generated images may be projected. For example, a virtual schematic may be displayed on a see-through screen in the HMD, so that the user may view the schematic as part of the user's view of the environment as the user moves, thereby augmenting the user's perception of the environment with the schematic.

For an augmentation to be effective, the virtual image needs to track its place in the environment as the user's field of view changes. A computer-generated virtual image should appear in the video image or on the see-through display as though it is properly located within the real-world environment. For example, an AR system may draw an electrical schematic over a circuit board in the user's view and maintain the correct position of the schematic with respect to the circuit board as the user's view changes. If the virtual image is attached to a moving real object, that real object also is tracked so that the virtual image may track the movement. The tracking of computer-generated images should also be dynamic such that changes in the environment do not affect the ability to track computer-generated virtual images.

Conventional AR systems use remote sensing applications such as optical, video, ultrasonic, or magnetic sensing equipment, in which the user's movement is recorded and/or calculated with respect to the environment. For example, a video image of the user's environment is captured to identify real-world objects using known object recognition algorithms, or pre-programmed points to retrieve information based on the identified objects. A combined display of a virtual image of the physical scene and information related to the identified objects may then be created. A tracking system may detect the user's eye movement and/or head movement to determine the user's field of view of the environment so that a computer-generated virtual image may be tracked with a selected object, such as a wall, floor or circuit board, and its location is tracked by the computer as the user's field of view changes. By tracking the movement of the user, the external equipment can compare the user's movement to a known or predetermined location of items within the field of view to determine the user's field of view from various points in the environment. By identifying the location of real-world objects, computer-generated virtual images may then be tracked with the selected object in the display of the environment. Such systems, however, may require a large amount of computer processing power and may require a costly tracking system worn by the user. Moreover, such systems also require knowledge or remote sensing of various objects in the environment in order to provide accurate tracking of a virtual image to the objects. Such AR systems are costly and do not allow a user to track a virtual image to an arbitrary object.

Accordingly, there is a need in the art for an improved AR system that provides tracking of a virtual image to arbitrary objects in the real-world environment, while still providing adequate accuracy, freedom of movement of the user, and simplicity of use.

BRIEF SUMMARY OF THE INVENTION

By way of introduction only, an advantage of the present invention is achieved by an apparatus and method for tracking arbitrary objects in an augmented reality ("AR") application. The present invention improves upon conventional AR systems by providing for the selection of an arbitrary object depicted in a video image of a scene of a real-world environment and registering a computer-generated image to the selected object, such that the computer-generated image accurately tracks the video image of the selected real-world object as the user's view of the environment changes or as the object moves.

It is a goal of the present invention to track arbitrary objects in augmented reality applications without requiring remote sensing equipment, prior knowledge of the environment, or objects in the environment.

It is another goal of the present invention to track a selected real-world object with a computer-generated image without pre-programmed information related to the placement, arrangement, position, orientation, or relationships of objects or the real-world environment. A computer-generated image may be embedded in a video image or within the user's field of view so as to accurately track the selected real-world object as the object and/or field of view of the user changes.

It is another goal of the present invention to track an arbitrary object in a real-world environment with a computer-generated image based on a calculation of a center of mass, or centroid, of an interframe difference of video images of the arbitrary object.

It is another goal of the present invention to track an arbitrary object in a real-world environment with a computer-generated image based on repetitive a determination of interframe differences for consecutive sequential video frames and calculations of the centroid for each sequential interframe difference. A virtual image may be located in a user's field of view or in the video image according to the centroid of for each sequential interframe difference. The video image with the virtual image may be displayed to the user and at a remote terminal.

One or more of the above goals and other goals may be achieved by an AR system having a video capturing device; a processor configured to generate and register a computer-generated virtual image to a selected object depicted in a video image according to a centroid of an interframe video image difference.

The video capturing device may be configured to acquire video images of a view of a real-world environment of a human user. The video image may have multiple sequential video frames, with each video frame having a plurality of pixels arranged according to a rectilinear coordinate system, wherein each pixel is associated with a pixel coordinate and has a pixel value.

The processor may be configured to provide for selection of an object depicted in the video image. The computer-generated virtual image may be registered with the selected object so as to track the selected object according to a centroid of an interframe video image difference of the selected object.

The AR system may include a video display configured to render the virtual image in a field of view of the viewer, such as on a head-mounted display. The head-mounted display may be a see-through display or a display on which the video image of the environment with the virtual image is depicted to a human user. The video capturing device may also be positioned on the head-mounted display so as to capture the user's view of the real-world environment.

The display may also include a terminal, such as a computer monitor or Tablet PC on which the video image and the virtual image are depicted. The terminal may be located proximate the user or remotely from the user.

It is also a goal of the present invention to provide a method for tracking an arbitrary object in an AR application including the steps of capturing a video stream of sequential video frames of a view of a real-world environment, determining an interframe difference for a selected object depicted in each video frame, calculating a location of a centroid for the interframe difference, and registering a computer-generated virtual image to the selected object based on the location of the centroid. For each successive video frame, the interframe difference and location of the centroid of the interframe difference may be determined, and the location of the virtual image associated with the location of the centroid.

The step of capturing a video image may include generating a graphic representation for each video frame, including a rectilinear grid of pixels with each pixel having a coordinate location within the video frame and a pixel value The interframe difference may be determined by defining a group of pixels associated with the selected object; and for a pair of sequential video frames, calculating a difference between corresponding pixels associated with the selected object based on pixel coordinates and pixel value.

The step of registering a computer-generated virtual image may include calculating a centroid for each interframe difference and tracking computer-generated image to the selected object according to the centroid. The computer-generated object may be embedded in the video image or on a see through display at a location associated with the calculated centroid.

The foregoing summary is provided only by way of introduction. The features and advantages of the present invention may be realized and obtained by means of the instrumentalities and combinations particularly pointed out in the claims. Nothing in this section should be taken as a limitation on the claims, which define the scope of the invention. Additional features and advantages of the present invention will be set forth in the description that follows, and in part will be obvious from the description, or may be learned by practice of the present invention.

DETAILED DESCRIPTION OF THE INVENTION

Figure 1:
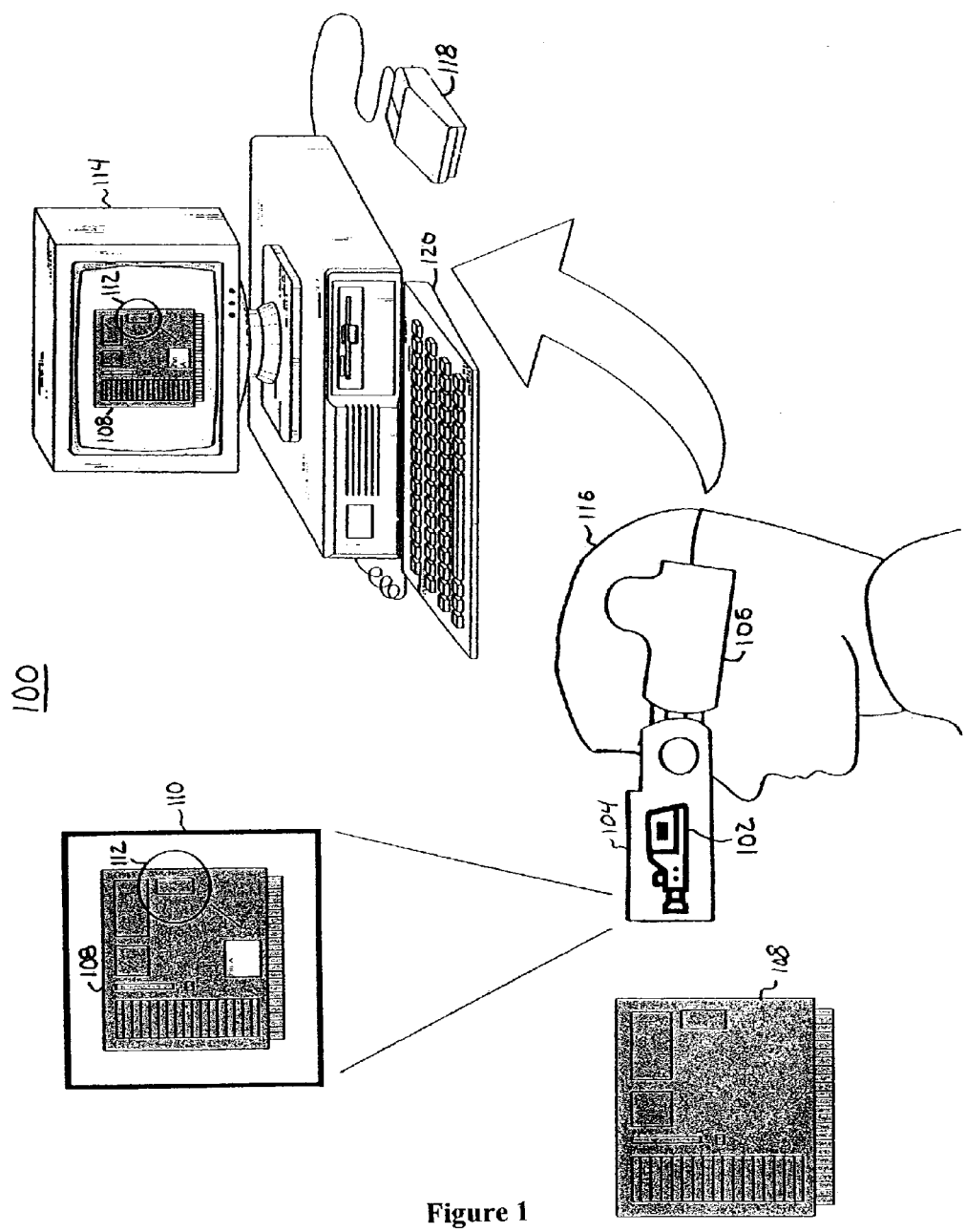
FIG. 1 illustrates an embodiment of an AR system according to principles of the present invention.

The present invention will now be described more fully with reference to the accompanying drawings. In each of the following figures, components, features and integral parts that correspond to one another each have the same reference number. The drawings of the figures are not true to scale.

The invention may be embodied in many different forms and should not be construed as limited to the embodiments set forth herein. These embodiments are described to provide a thorough and complete disclosure and fully convey the scope of the invention. The present invention may be embodied as a method, a data processing system, a software product, or an augmented reality system. The present invention may take the form of electronic hardware embodiment, a computer software embodiment, or as an embodiment of a combination of both hardware and software. Accordingly, the present invention may be embodied as electronic components, utilizing a computer program product on a computer-readable storage medium, such as hard disks, CD-ROMs, optical storage devices, or magnetic storage devices.

Many activities in a real-world environment, such as in an industrial or commercial work space, can be made more efficient by providing an individual with information about the activity, the individual's environment including objects in the environment, and the relationships between the individual, objects, activity, and the environment. Activities may include things such as maintenance of equipment or facilities on a factory floor, troubleshooting or set-up of equipment, layout of an architectural design, and computer gaming. Augmented reality ("AR") applications, in which an individual's perception of a real-world environment is enhanced by computer-generated virtual images, have found utility in making these activities more efficient.

The real-world environment may include one or more objects of interest located within the environment. Prior information about the objects, its location, orientation, or arrangement within the environment may not be known.

Because no, or relatively little prior information about the object may be known, such objects may be referred to as arbitrary objects.

Arbitrary object tracking in an AR application may make activities more efficient by equipping a user with a computer having a processor to provide a computer-generated virtual image associated with practically any object in the real-world environment. The virtual image is displayed on a small wearable or handheld display and/or on a remote terminal, such as a computer monitor. The small wearable display may also include a small wearable camera for capturing a video image of the user's environment. Both the wearable display and wearable camera may be mounted on a pair eyeglasses or goggles and may be connected to a small wearable computer.

Video images of the objects are captured from the perspective of a field of view of a viewer of the real-world environment, and as the viewer and/or the object move. When the object is within the field of view of the camera, the wearable computer can "see" the object and depict the object as part of a video image of the environment in the wearable display and/or the terminal. The viewer, or an operator located remotely from the viewer, may select one or more of the objects depicted in the video image, and associate a virtual image, such as an annotation or computer-generated overlay, with the selected object. The computer may process the video images to register the virtual image to the selected object according to a centroid of an interframe difference of the video image associated with the object, so that the virtual image tracks the object as the viewer's field of view changes or as the object moves within the field of view. Tracking the object according to a centroid of an interframe difference allows selection of an object without prior knowledge of relationship of the object to the real-world environment. The location, orientation, size, and arrangement of the object and other predetermined fiduciary points do not need to be known or programmed to the computer prior to the selection of the object in order to register the virtual image to the object. The wearable display and/or terminal may be used to display the virtual image at a position that is associated with the video image of the object. Accordingly, the invention provides for tracking an arbitrary object in an AR environment.

FIG. 1 illustrates an embodiment of an AR system 100 that provides for arbitrary object tracking. The AR system 100 may include a video capturing device 102, a viewer display 104, and a computer 106 having a processor. The video capturing device 102 may be configured to capture video images 110 of the field of view of the environment of a viewer 116. The video capturing device 102 may be a digital video camera configured to acquire a digital video image 110 and positioned to detect the field of view of the viewer 116. The video image 110 may include a sequence of video frames, which in sequential combination provide a video image of the real-world environment as the viewer 116 views the real-world environment and in real time. Each individual video frame is composed of multiple individual pixels, each representing a segment of the video frame. The pixels may be arranged graphically according to rectilinear coordinates, having a horizontal coordinate component (x) and a vertical coordinate component (y). Each pixel is also associated with a pixel value (z), representing a color and/or gray scale component for the pixel (x,y) of the video frame.

The viewer display 104 may be configured to be worn by the viewer 116 and positioned to display images to the viewer 116. In an embodiment, the viewer display 104 may be a head-mounted display ("HMD") configured to be mounted on the viewer's head and having a headband that may assist with keeping the HMD positioned on the viewer's head. The HMD may be a wearable see-through display on which a computer-generated image may be displayed in the field of view of the viewer 116 or may be a single or pair of small video displays on which a captured video image 110 of the viewer's field of view of the real-world environment is displayed with an embedded computer-generated virtual image. The video capturing device 102 may be disposed on the display 104 so as to capture a video image from the perspective of the field of view of the viewer 116. In another embodiment, the viewer display 104 may be a portable video terminal or screen (not shown) configured to be hand-carried by the viewer 116.

The computer 106 is configured to process the video images 110 captured by the video capturing device 102 and provide for an input selection of an object 108 depicted in the video image 110. The computer 106 is coupled to the video capturing device 102 and the viewer display 104 through a wireless network, such as through a transceiver, or through cables. In an embodiment, the computer 106 is configured to be worn by the viewer 106 and may be a component of the display 104 or configured to be strapped to the waist, arm or leg of the viewer 116. In another embodiment, the computer 106 may be sized and configured to be hand-carried by the viewer 116, such as a personal digital assistant or Tablet PC (not shown). The computer 106 may also include a wireless transmitter and antenna 28 for wireless connectivity to a computer network.

The AR system 100 may include several components that are presently commercially available. The display 104 may be a see-through or see-around micro-optical display, such as eyeglass displays commercially available from Microoptical Corp., Boston, Mass. USA. The video capturing device 102 may be attached to or integrated with the eyeglass displays. The computer 106 may be one such as commercially available from Xybernaut Corp., Fairfax, Va., USA, with a wireless communication transceiver, for example using an IEEE 802.11(b) protocol. The computer 106 includes software configured to process video images 110 and provide for a selection of a segment of the video image 110.

The AR system 100 may also include a terminal 114, or computer, that is located remotely from the viewer 116. The terminal is in electrical communication with computer 106 through one or more cables, through a wireless network, through publicly distributed communication networks such as the internet, or through any combination thereof The terminal 114 is configured to receive the video image 110 captured by the video image capturing device 102 and to visually display the video image 110. The terminal 114 also includes at least one operator input device, such as a mouse 118, a keyboard 120, or a tablet PC. The operator at a remote location may view the video image 110 on the terminal 114 and using the operator input device 118, 120, the operator may select an object 108 depicted in the video image to which a computer-generated virtual image 112 is to be associated. Once the operator selects the object 108 in the video image 110, the computer-generated virtual image 112 is registered to the object 108 and displayed virtually simultaneously with the object 108 on the terminal 114 and the viewer display 104. Similarly, the viewer 116 may use computer 106 to select an object 108 depicted in the video image 110 to which a computer-generated virtual image 112 may be associated.

An exemplary object 108 in the real-world, such as a circuit board 108, may be of interest to the viewer 116 or the operator. As the viewer 116 views the object 108, the video capturing device 102 captures a video image of the object 108 and practically simultaneously displays the video image at the remote terminal 114. The video image 110 may also be displayed on the viewer display 104. When the viewer display 104 is configured as a see-through display, the viewer display 104 is configured to allow the viewer to see the object through the display 104 and allow the display of a computer-generated image in the display 104. The viewer, using the computer 106, and/or an operator using the remote terminal 114, may select an item of interest such as the object 108, or a portion thereof By way of example, using an input device configured to select a portion of the video image, the viewer 116 or the operator of the remote terminal 114 may encircle, or "click on," an object in the video image that is desired to be selected and tracked. Once the object 108 is selected, the viewer 116 or the operator at the remote terminal 114 may associate a computer-generated virtual image 112, such as a text annotation, a computer graphic, or an overlay, with the selected object 108.

The virtual image 112 may be registered to the object 108 by computer 106, so that the virtual image 112 virtually simultaneously tracks the selected object as the object and/or the viewer 116 moves within the real-world environment. The virtual image 112 may be displayed on the display 104 such that the virtual image 112 is superimposed on the real object as viewed by the viewer 116. By way of example, the display 104 is a heads-up see-through display attached to a pair of eyeglasses or goggles worn by the viewer 116. When the viewer display 104 is configured as a see-through display and with the virtual image 112 registered to the object 108, the computer 106 renders the virtual image 112 on the viewer display 104 at a location on the display 104 that has been determined to be correspond with the selected object 108 in the field of view of the viewer 116. The virtual image 112 may also be displayed at the terminal 114 or in the viewer display 104 as an embedded part of the video image 110 and located within the video image 110 at a location corresponding to the selected object 108. As the selected object 108 moves with respect to the video image 110, such as by the movement of the viewer's head or the movement of the object in the real-world environment, the virtual image 112 tracks the movement of the object 108.

The computer 106 may be used to display additional data associated with the selected object in response to a request sent by the viewer or the operator at the remote location. The request may be an electric signal generated by a voice command from the viewer 116 or operator or by a physical touch by the operator, or the request may be a focused gaze upon the object for an extended period of time. Depending on the viewer's activity, the "query" gaze may be between 1 and 2 second of steady gaze for fast-paced activity, such as working in a warehouse, to 5 seconds or longer for slow-paced activity, such as working on a small parts assembly bench, where a viewer's gaze does not change much. The timing for such automated requests may be customized for each viewer.

The computer 106 and terminal 114 each include a processor that executes computer code, or software, that may be configured to provide instructions to the processor to register to the virtual image 112 to object 108 so that the virtual image 112 virtually simultaneously tracks object 108. Such computer code may reside, either temporarily or permanently, in a memory component (not shown) of computer 106, of terminal 114, of a computer or server of a communications network to which computer 106 and terminal 114, of a computer or server of a communications network, or any combination thereof It is desirable that the processor for the computer 106 and terminal 114 be capable of operating at a clock speed of 500 MHz or greater, although a processor that operates at slower operating speeds may be configured to execute the computer code according to the principles of the present invention.

A viewer's profile may be stored in the computer 106 or any data storage component on the network in communication with the processor in the AR system. The profile may include the individual viewer's preferred response times associated with an activity, a piece of equipment and other parameters for data response interaction with the AR system. Multiple-user profiles may be stored for an individual, where each profile is associated with different roles or activities. Such activities may be input by the viewer or operator or may be automatically determined from the viewer's routines or habits.

Figure 2:
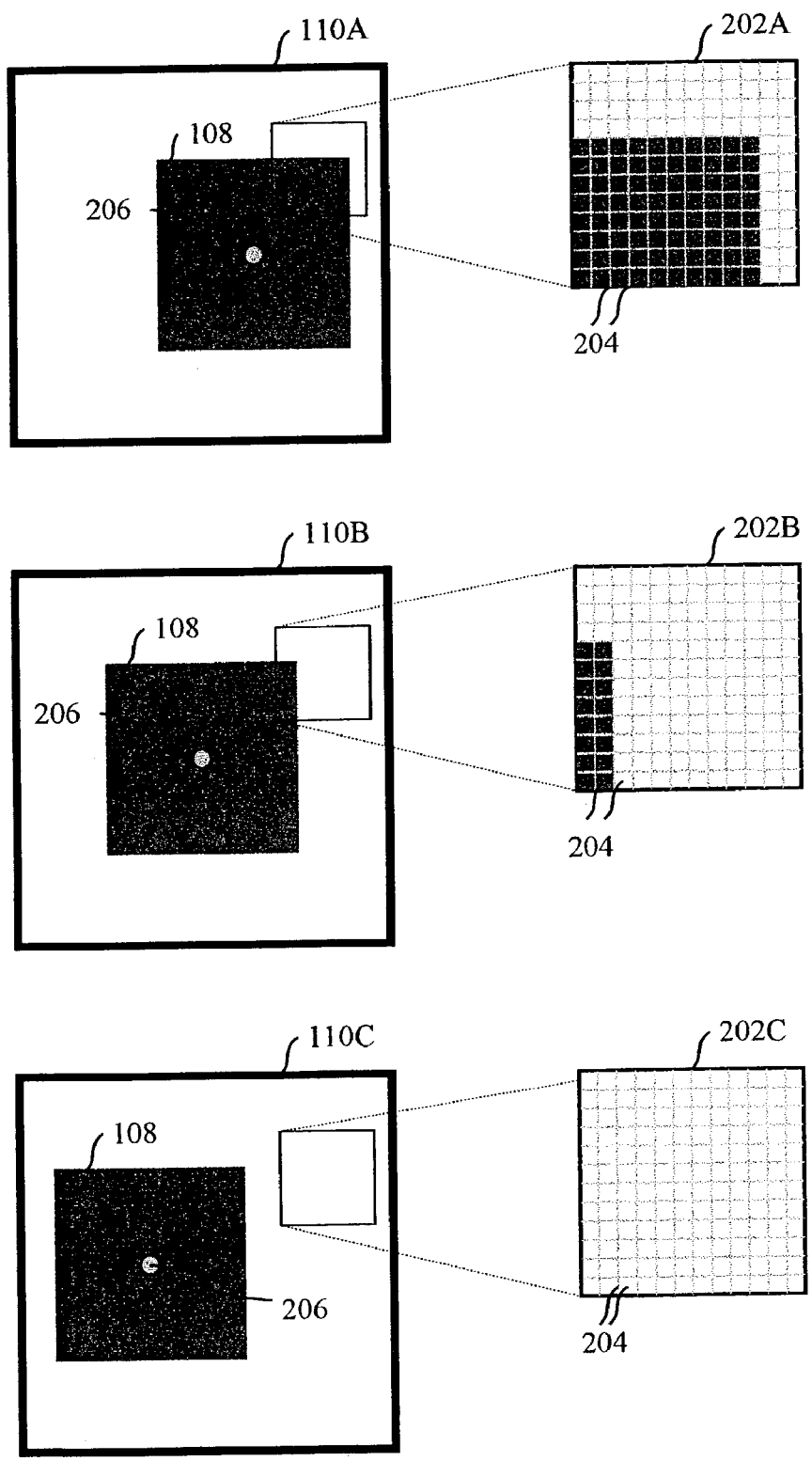
FIG. 2 illustrates a sequence of acquired video frames for the illustrative embodiment of an AR system of FIG. 1.

FIG. 2 depicts a sequence of three illustrative consecutive video frames of the video image 110 acquired by the video capturing device 102 of the illustrative embodiment of the AR system 100. The illustrative video frames include a first video frame 110A, a second video frame 110B, and a third video frame 110C. Each video frame 110A, 110B, 110C depicts a discrete momentary visual representation of the field of view of the viewer 116 as captured by the video capturing device 102, including the exemplary object 108. Each video frame 110A, 110B, 110C may be displayed, or "played back" in rapid succession so as to depict a moving picture as perceived by the viewer 116 or the operator. For purposes of simplification, an embodiment is described wherein the object 108 depicted in the video image is a black square, which could be representative of any selected object 108 in the real-world environment, such as a box, a component of a circuit board, a door, a tool, a sign, a portion of a schematic or blueprint, or any other object of interest in the real-world environment. For further simplification of the description of the principles of the present invention, the object 108 is captured and depicted in a real-world environment having a white background.

The sequence of video frames 110A, 110B, 110C represents change in the viewer's perspective, or the movement of the object 108 in the real-world environment with respect to the viewer. As the viewer's head moves from left to right, the object 108 moves with respect to the video frames 110A, 110B, 110C, from right to left. Similarly, if the object 108 were to move from right to left while the viewer's head remained stationary, the sequence of video frames 110A, 110B, 110C would track the movement of the object 108 in each successive video frame by depicting the object moving from right to left. Accordingly, in the first video frame 110A, the object 108 is located towards the right of the video frame 110B; in a second video frame 110B, the object 108 is located towards the center; and in the third video frame 110C, the object is depicted towards the left.

Each video frame is composed of multiple picture elements known as pixels 204. A close-up view 202A, 202B, 202C illustrates an arrangement of the pixels 204 for corresponding video frame 110A, 110B, 110C. The pixels 204 may be arranged within the video frame according a rectilinear grid, wherein each pixel is associated with a pixel coordinate ($x_i$, $y_j$), wherein $x_i$ represents a horizontal location of the pixel within the video frame 110A, 110B, 110C, and $y_j$ represents a vertical location of the pixel 204. Each pixel 204 may be characterized by a pixel value z, corresponding to a gray scale and/or color value for the pixel 204. By way of example, a pixel value of "1" may be associated with a black pixel, while a pixel value of "0" may represent a white pixel. As shown in views 202A and 202B, each pixel 204 associated with the object 108 is black and therefore, has a pixel value of "1," while pixels 204 associated with the white background have a pixel value of "0." Because only the white background is shown in view 202C, each pixel 204 has a value "0."

Based on calculations for each pixel coordinate $(x_i, y_j)$ and pixel value, a visual center of mass 206, or centroid, of the exemplary object 108 can be determined. The centroid may be considered a coordinate location within each video frame 110A, 110B, 110C that is the average, or mean, of corresponding coordinates of a given set of pixels 204. For a selected object 108, each pixel 204 associated with the object 108 has a mass characterized by the pixel value, z, and the centroid 206 may be characterized as a location of the center of mass for the selected object 108. Accordingly, the centroid for the object 108, may be determined based on pixel value (z) and pixel coordinate $(x_i, y_j)$ for each pixel associated with the object 108. The location of the centroid may be calculated using known formulas for determining the center of mass. In embodiment, a horizontal coordinate $(X_m)$ for the centroid may be determined according to Equation 1, while a vertical coordinate $(Y_m)$ may be determined according to Equation 2:

$$X_m = \frac{\sum_{i=1}^{r} z_i * x_i}{\sum_{i=1}^{r} z_i} \quad \text{EQ. 1}$$

$$Y_m = \frac{\sum_{j=1}^{r} z_j * y_j}{\sum_{j=1}^{r} z_j} \quad \text{EQ. 2}$$

where $x_i$ represents the horizontal coordinate and $z_i$ represents the pixel value for the ith pixel, and $y_j$ represents the vertical coordinate $z_j$ represents the pixel value for the jth pixel. For a uniformly shaped and weighted (colored) object 108, such as a black square, the centroid will be located substantially at the center of the object.

An interframe difference between video frames may be determined by calculating the absolute difference between two video frames 110A, 110B, 110C based on pixel coordinates and pixel values. For a given pixel 204 $(x_i, y_j)$, an absolute difference of the pixel value (z) between two video frames may be calculated. In particular, an interframe difference for a given pixel may be determined according to abs(second video frame $(x_i, y_j, z)$—first video frame $(x_i, y_j, z)$). Because video frames 110A, 110B, 110C may be characterized by a distribution of pixels 204, with each pixel having a pixel coordinate $(x_i, y_j)$ and a pixel value (z), the interframe difference between two video frames may also be characterized by a distribution of pixels. By way of example, as exemplary object 108 moves from right to left with respect to the first video frame 110A and the second video frame 110B, a given pixel may change from having a pixel value of "1" in the first video frame 110A, to a pixel value of "0" in the second video frame 110B, and the absolute difference for the pixel $(x_i, y_j)$ would be "1." Likewise, the absolute difference for a pixel $(x_i, y_j)$ that does not change between the first video frame 110A and the second video frame 110B, may be "0."

Figure 3:
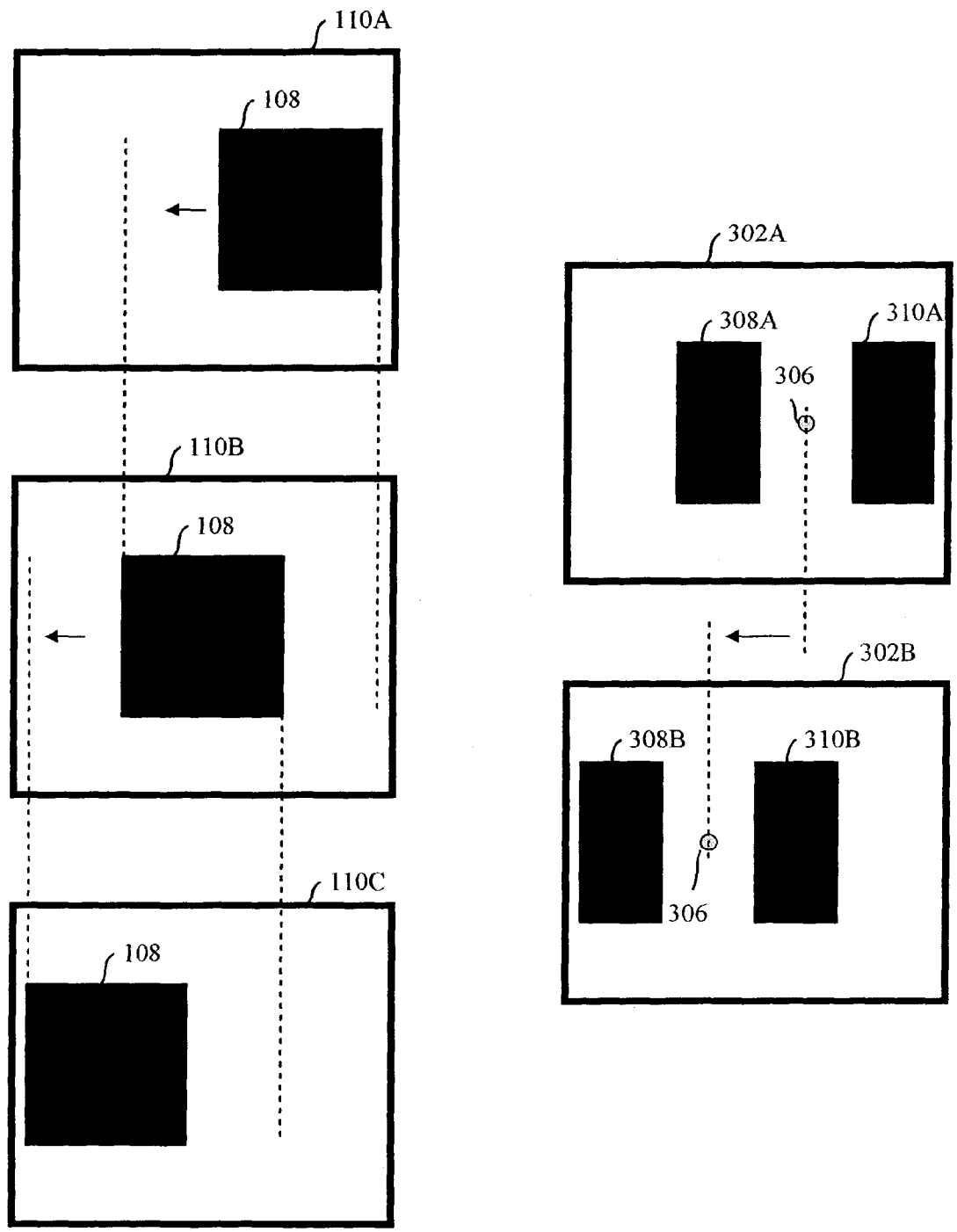
FIG. 3 illustrates a sequence of acquired video frames for the illustrative embodiment of an AR system of FIG. 1 and a sequence of consecutive graphical representations of interframe differences for the acquired video frames.

FIG. 3 depicts a plot of a first interframe difference 302A between consecutive video frames 110A, 110B and a plot of a second interframe difference 302B between consecutive video frames 110B, 110C. The depiction of the first interframe difference 302A illustrates the distribution of absolute differences of the pixels 204 between the first video frame 110A and the second video frame 110B. Likewise, the depiction of the second interframe difference 302B illustrates the distribution of absolute differences of the pixels 204 between the second video frame 110B and the third video frame 110C. The first interframe difference 302A and the second interframe difference 302B together represent sequential interframe differences of consecutive video frames 110A, 110B, and 110C. The depictions of the first interframe difference 302A and the second interframe difference 302B are provided for purposes of providing a simplified explanation of the determination of an interframe difference between video frames. The first and second interframe differences 302A, 302B may not be visually reproduced in order to carry out the principles of the present invention.

The first interframe difference 302A illustrates portions of the video frame where pixel values (z) have changed between video frames 110A and 110B, as the absolute difference between the pixel values (z). Where a black pixel has a value "1" and a white pixel has a value "0," any pixel which may have changed from black-to-white or white-to-black between video frames 110A, 110B will have an interframe difference of "1" (black), while those pixels that do not change, have an interframe difference pixel value of "0" (white). Accordingly, the first interframe difference 302A may be represented as a plot of the difference of pixel value (z) for each pixel $(x_i, y_j)$ between video frames 110A, 110B. As the exemplary object 108 moves from right to left between video frames 110A 110B, pixels on the right side 310A and on the left side 308A of the object 108 change and have a pixel value "1," while those located more centrally to the object 108 may not change and have a pixel value "0." Accordingly, the interframe difference 308A, may be plotted as two lines or two boxes 308A, 310A located according to where there was a pixel value change between the two video frames 110A, 110B.

Similarly, second interframe difference 302B illustrates portions of the video frame where pixels values (z) have changed between video frames 110B and 110C, as the absolute difference between the pixel values (z). The depiction of the second interframe difference 302B illustrates where a pixel value change has occurred between video frames 110B and 110C. As object 108 moved further from right to left, the pixels 204 on either side of the object 108 also changed, while those more centrally located have not changed. Therefore, the depiction of the second interframe difference 302B includes a portion to the right side 310B of the object where there was a change in the video, and a portion to the left side 308B of the object 108, where there was a change in the video between video frames 110B and 110C.

A coordinate location of the visual center of mass, or centroid, 306 for each interframe difference 302A, 302B may be determined according to Equations 1 and 2 above. As the exemplary object 108 moves from right to left with respect to consecutive video frames 110A, 110B, 110C, the location of the centroid 306 also moves from right to left, tracking the movement of the object 108. Accordingly, the computer generated virtual image 112 can be located, or registered, with respect to the video frame according to the location of the centroid 306 for the object 108. When it is determined that the centroid 306 has moved, the virtual image 112 may be relocated according to the determined movement of the centroid 306. Therefore, the location of the virtual image 112 may be associated according to the movement of the centroid 306 and accurately track the movement of the object 108 with respect to the video image 110. For successive video frames, the virtual image 112 may track the movement of the object 108 by repetitive, continuous determination of the interframe difference for each consecutive video frame, the coordinates of the centroid 306 determined and the virtual image 112 relocated according to the determination of the location of the centroid 112.

The centroid 306 may also be determined from a subset from each interframe difference 302A, 302B. For example, the centroid 306 may be determined based on the pixel value (z) of each interframe difference 302A, 302B, wherein pixels of each interframe difference 302A, 302B having a pixel value greater than a threshold value are considered in the calculation of the centroid 306. By using the threshold value of the pixel value for each interframe difference to determine the location of the centroid 306, pixels that have a relatively small change, or change that is less than the threshold value, such as changes due to noise, will not be used in the determination of the location of the centroid 306. A higher accuracy of the location of the centroid 306 may be obtained. For example, for each interframe difference 302A, 302B, only the pixels having a pixel value (z) that represents a greater than 50% change may be used to determine the location of the centroid 306, and therefore, areas of the video frame that have small changes are filtered out of the determination.

The computer 106, or the terminal 114, may display the computer-generated virtual image 112 at a location within the video image 110 according to the location of the centroid 306. When the location of a centroid 306 is determined for the interframe difference of the first video frame 110A and the second video frame 110B, the computer 106 or terminal 114 may display the virtual image in the third video frame 110C at a location associated with the centroid 306. As the centroid 306 moves within successive video frames 110A, 110B, 110C, the computer 106, or terminal 114, determines the location of the virtual image 112 based on the movement of the centroid 306 between consecutive video frames. Because the centroid 306 is located according to the interframe difference between two video frames, the virtual image 112 will accurately track the movement of a selected object 108 as it moves with respect to the video frames. By determining the location of the centroid 306 of the interframe difference, any movement of the object 108 may be detected and the virtual image 112 registered to the detected movement. For example, when it is determined that the centroid 306 of the interframe difference has moved along in a horizontal direction by three pixels, the virtual image 112 may track the movement by being relocated three pixels, and therefore follow the selected object 108. Accordingly, an absolute or relative position, arrangement, or relationship of the object 108 need not be determined in order to accurately track a virtual image 112 to the object 108.

The frame refresh rate in the display 102 and terminal 114 is sufficiently fast so that any delay in rendering a virtual image 112 from actual movement of the object 108, is negligible and not detectable by the viewer 116. Moreover, the viewer may select multiple objects in the video image 110 and associate, therefore track, a virtual image to the selected object. The video frames 110A, 110B, 110C are captured and displayed, or "played back," at a sufficiently high rate (frequency) so that the interframe difference for the object 108 is relatively small. By way of example, a digital video camera 102 may acquire a video image where the sequence of video frames 110A, 110B, and 110C is captured at frequency in the range of 23 Hz to 60 Hz, or at a rate of 23 to 60 video frames per second. Because the movement of an object 108 is relatively much slower, the interframe difference for the object 108 is relatively small and may be quickly determined. Accordingly, errors in tracking the object 108 are minimized and the computer 106 need not verify whether any changes are due to a new scene.

Figure 4:
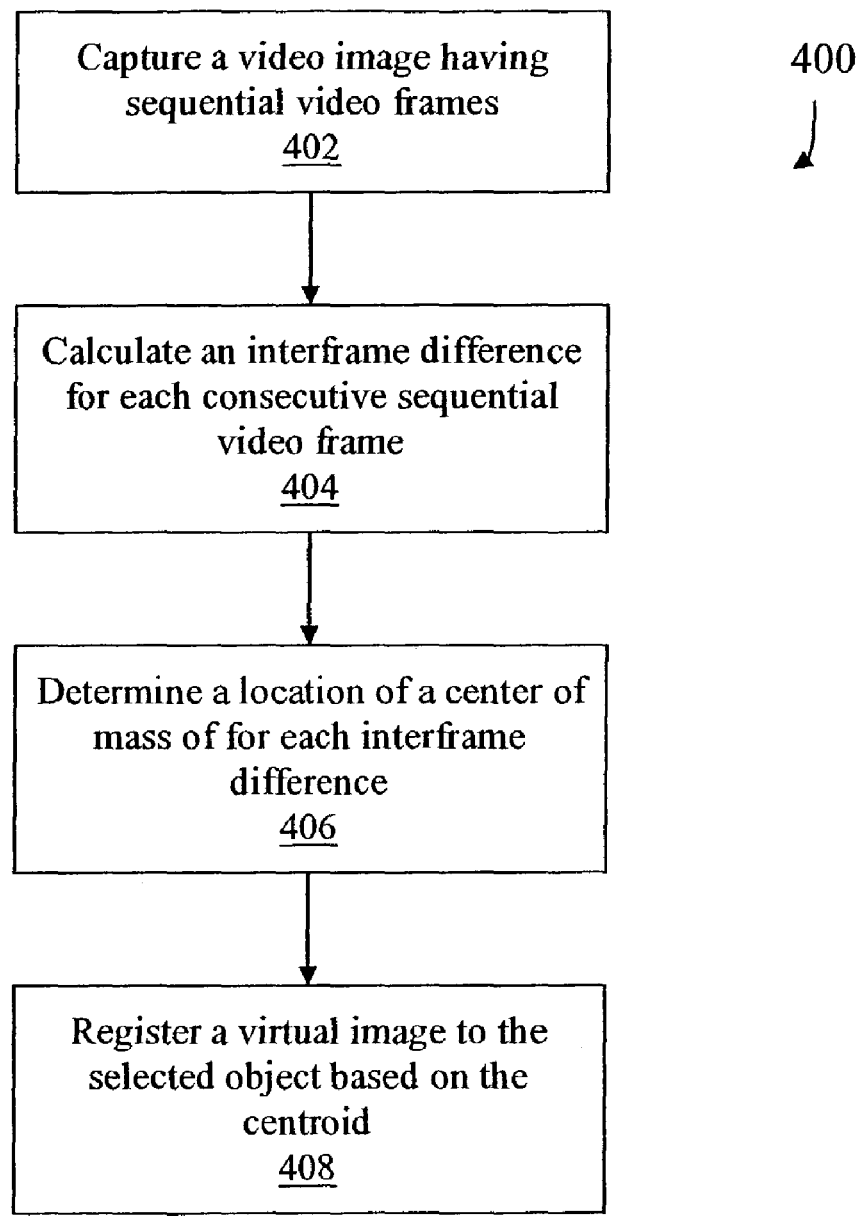
FIG. 4 illustrates a schematic flowchart according to a method for tracking an arbitrary object in an augmented reality application embodying the present invention.

FIG. 4 illustrates a schematic flowchart for an embodiment of a method for tracking an arbitrary object in an AR application 400. One embodiment of a method according to the principles of the present invention may include the steps of capturing 402 a video image having a stream of consecutive video frames; calculating 404 an interframe difference between consecutive video frames; determining 406 a location of a centroid for the interframe difference; and registering 408 a computer-generated image to the selected object based on the location of the centroid of the interframe difference. The steps of capturing 402, calculating 404, determining 406, and registering 408 may be repetitively performed for the stream of consecutive video frames so that the computer-generated image tracks a selected object as the object moves with respect to the video image.

The step of calculating 404 an interframe difference may include defining pixels associated with a selected object depicted in the video frame. Each sequential video frame may include a rectilinear grid of pixels which forms a visual representation of the field of view of a viewer. Each pixel may be arranged according to grid coordinates $(x_i, y_j)$ and have a pixel value (z). The grid coordinates $(x_i, y_j)$ are associated with the location of the pixel with respect to the video frame and the pixel value represents a color and/or gray scale component for the pixel. For sequential video frames, a difference between the video frames may be calculated according to each pixel associated with the selected object based on pixel value. The interframe difference between consecutive video frames represents a change in pixel value for each pixel associated with the selected object. The interframe difference may be determined according to abs(second video frame $(x_i, y_j, z)$—first video frame $(x_i, y_j, z)$). A change in the video image between video frames may occur due to, for example, object movement with respect to the video frame or change due to a movement of the viewer.

The step of determining 406 a location of the center of mass of the interframe difference, or centroid, may include determining a coordinate location of the center of mass $(X_m, Y_m)$ according to pixel coordinates and pixel values for the interframe difference. The coordinate location for the centroid $(X_m, Y_m)$ may be determined according known methods and principles for determining a local point for a distribution of points or a system of points at which the entire mass may be considered as concentrated. The horizontal component $X_m$ of the location for the centroid may be determined according to Equation 1, while the vertical component $Y_m$ of the location for the centroid may be determined according to Equation 2 above. The centroid may be determined using the interframe difference or a subset of the interframe difference such as using only pixels of the interframe difference having a value greater than a threshold value.

The step of registering 408 may include tracking a computer-generated image with respect to video image based on the calculated location of the centroid. By tracking the computer-generated image to the location of the centroid of the interframe difference, the computer-generated image may be registered to the selected object and track the movement of the object with respect to the video image. The computer-generated image may be displayed as, a visual image to the viewer in a see-through display, such as a see-through HMD. The virtual image may also be embedded in the video image on a display configured to be viewed by the user of the AR system, such as a portable video terminal, a Tablet PC or on a HMD. Similarly, the virtual image may be embedded and displayed in the video image at a remote terminal.

Various embodiments of an arbitrary object tracking in an augmented reality application have been described and illustrated. However, the description and illustrations are by way of example only. Many more embodiments and implementations are possible within the scope of this invention and will be apparent to those of ordinary skill in the art. The various embodiments of this invention are not limited to an industrial or commercial environment, but can be applied to a wide variety of activities, such as gaming, architectural designs, or surgical procedures. Accordingly, similar scenarios can be described in situations such as hospitals, factories, oil fields, chemical plants or anywhere that physical tasks are carried out in which knowledge of the activity would make the activity safer and/or more efficient.

This invention allows the viewer and remote operator to interact with the real-world environment in a very natural manner. It is desired that the wearable camera is focused within the same field of view as the viewer when focusing straight ahead. In this way, the AR system can see the real-world environment that the operator is focusing on and thus allow selection of arbitrary objects that are within the field of view of the viewer. The system can provide information about the objects in the real-world environment to the viewer so as to assist the viewer with activities related to those objects. An operator at a remote location may select an object within the viewer's field of view and provide information about that object using a computer-generated annotation that is displayed to the viewer. The viewer can see the information provided in the annotation and immediately associate that information with the selected object.

By way of example, a viewer such as a technician located on a factory floor may be installing a piece of machinery in the factory. The technician may have mechanical skills, but may not be considered an expert with a new piece of machinery. When the technician is outfitted with the AR system providing arbitrary object tracking, the AR system may be used to overlay schematics and other data over the technician's field of view. Using the arbitrary object tracking, an operator at a remote terminal may view objects within the field of view of the technician, select an object and provide information in the form of a visual annotation in the viewer's field of view. When the technician views the object, s/he will see the annotation. Accordingly, the AR system may find application by using a camera to send the technician's point of view to a remote expert who can see precisely what the technician is doing and annotate the technician's view by circling or tagging an object with virtual images. The arbitrary tracking mechanism ensures that the virtual images stay attached to the real objects while the technician is working. This type of expert assisted work has applications in various industries, from factory maintenance, to remote surgical applications, architectural designs, and disaster relief efforts.

Similarly, a person whose job responsibilities involve the operation or manipulation of objects, such as an assembly line operator, may receive an image providing visual information associated with the operation of an object within their field of view. It is further contemplated that the AR system may also have application in a scenario where a consumer places a call to a customer service line where the customer representative helps someone at home as they assemble toys, furniture, appliances, hardware, tools, or other consumer items. Likewise, a firefighter may see information about safety precaution or about the volatility of the contents of an object, wherein the information is provided from a remote location from the firefighter. A sightseer may view information about points of interest while vacationing in a foreign city. Accordingly, the arbitrary object tracking provides flexibility in allowing freedom of selection of objects in the real-world without having prior information regarding the location, orientation, or spatial relationship of the object. In addition, the arbitrary object tracking system does not require sensing equipment and may be used with data obtained from a single video capturing device. Based on this approach, a virtual image can be registered to any arbitrary object in the user's field of view, and can accurately track the real object as the user and/or the object move within the environment.

It is intended in the appended claims to cover all such changes and modifications which fall within the true spirit and scope of the invention. Therefore, the invention is not limited to the specific details, representative embodiments, and illustrated examples in this description. Accordingly, the invention is not to be restricted except in light as necessitated by the accompanying claims and their equivalents.

What is claimed is:

1. A computer readable medium having stored thereon computer executable instructions to cause a computer programmed thereby to perform a method for tracking an image to an arbitrary object captured in a video representation of a real-world environment, wherein the method of performing comprises:
   (a) capturing the video representation of the real-world environment, wherein the video representation includes a sequence of video frames, each having a plurality of pixels arranged according to a rectilinear coordinate grid where each pixel is defined by a pixel value;
   (b) registering the image to the object according to movement of a centroid of an interframe difference between consecutive interframe differences of sequential video frames associated with the object, the interframe difference being determined according to differences between pixel values of corresponding pixels associated with object for consecutive video frames; and
   (c) generating a signal to display the image in a humanly visualized form at a location in apparent registration to the arbitrary object.

2. The computer readable medium of claim 1 further comprising executable instructions for displaying the image embedded in the video representation.

3. The computer readable medium of claim 1 further comprising executable instructions for displaying the image in a viewer display.

4. An augmented reality device, comprising:
   (a) a video capturing device configured to acquire video images of objects in a real-world environment of a human viewer, to video image having a plurality of sequential video frames;
   (b) a processor configured to register a virtual image to an arbitrary object depicted in the acquired video image according to a centroid of an interframe video image difference between successive sequential video frames of the acquired video image; and (c) a display configured to render the virtual image in a field of view of the viewer.

5. The device of claim 1, wherein the display comprises a head-mounted display.

6. The device of claim 1, wherein the display comprises a see-through head-mounted display.

7. The device of claim 1, wherein the display comprises a video terminal.

8. The device of claim 1, wherein the display comprises a remotely located video terminal in communication with the processor.

9. The device of claim 1, wherein each of the plurality of sequential video frames comprises a plurality of pixels arranged according to rectilinear coordinate system wherein each of the plurality of pixels is associated with a pixel coordinate and a pixel value.

10. The device of claim 9, wherein the processor is further configured to define a segment of the plurality of video frames associated with the arbitrary object according to pixels associated with the arbitrary object and to calculate an interframe difference for consecutive video frames based on pixel value for the pixels associated with the segment.

11. The device of claim 10, wherein the processor is further configured to determine a coordinate location of the centroid for the interframe difference of consecutive video frames.

12. The device of claim 11, wherein the processor is further configured to associate a location of the virtual image according to the coordinate location of the centroid.

13. The device of claim 12, wherein the processor is further configured to determine a coordinate location of the centroid based on a subset for the interframe difference of consecutive video frames.

14. The device of claim 12, wherein the processor comprises a wearable processor.

15. The device of claim 12, wherein the processor comprises a remote processor.

16. A method for tracking an arbitrary object in an augmented reality application, the method comprising:

(a) capturing a video image of a user's field of view, the video image having a stream of sequential video frames;

(b) determining an interframe difference between consecutive video frames of the stream of sequential video frames, the interframe difference being associated with a selected object depicted in the video image; and (c) registering a computer-generated image to the selected object based on a movement of a coordinate location of a centroid of the interframe difference.

17. The method of claim 16, further comprising:

(d) generating a signal to display the computer-generated image in a humanly visualized form.

18. The method of claim 16, wherein step (a) comprises the step of generating a graphic representation of the field of view for each video frame, the graphic representation including a rectilinear grid of pixels, wherein each pixel is associated with a pixel coordinate and a pixel value.

19. The method of claim 18, wherein step (b) comprises the steps of:

(i) defining pixels associated with the selected object; and (ii) for a pair of sequential video frames, calculating a difference between pixels associated with the selected object based on pixel coordinate and pixel value.

20. The method of claim 19, wherein step (c) comprises the step of:

(i) calculating the centroid for an interframe difference of consecutive video frames, the centroid being located at a coordinate location of a center of mass of the interframe difference; and (ii) associating a location of the computer-generated image with respect to video image based on the location of the centroid.

21. The method of claim 20 further comprising:

(iii) for each sequential video frame, calculating the centroid for an interframe difference of consecutive video frames; and (iv) for each sequential video frame, associating the location of the computer-generated image based on the calculated location of the centroid.

22. The method of claim 21 further comprising the step of displaying a visual representation of the virtual image in a see-through display.

23. The method of claim 21 wherein step (c) is performed by a wearable processor.

24. The method of claim 21 wherein step (c) is performed by a remote processor.

25. The method of claim 21 further comprising the step of displaying a visual representation of the virtual image embedded in the video image.

26. The method of claim 21 wherein the step (iii) comprises calculating the centroid for an interframe difference of consecutive video frames based on a threshold pixel value.

27. The method of claim 21 further comprising the step of displaying a visual representation of the virtual image and the video image at a remote terminal.

28. The method of claim 27 wherein the step of displaying a visual representation of the virtual image and the video image at a remote terminal comprises delivering a video signal to the remote terminal over a digital networking infrastructure.

29. The method of claim 28 wherein the step of displaying a visual representation of the virtual image and the video image at a remote terminal comprises delivering a video signal to the remote terminal via an analog video transmission.

30. A method for augmenting a field of view of a real-world environment comprising the steps of:

(a) generating a video image associated with the field of view, the video image defined by a sequence of video frames each including a pixel representation of the field of view;

(b) selecting an object in the video image, the selected object associated with pixel representations in the sequence of picture frames; and (c) registering a computer-generated image to the pixel representations of the selected object according to a centroid of a difference between each sequential pixel representation associated with the selected object.

31. The method of claim 29 further comprising the step of generating a signal to display the computer-generated image in a humanly visualized form.

32. The method of claim 31 wherein the pixel representation includes a plurality of pixels, each pixel being associated with a respective grid coordinate and a respective pixel value.

33. The method of claim 32 wherein the step (c) comprises the steps of:

(i) defining a pixel group associated with the selected object;

(ii) for each sequential pixel representation, calculating a difference between the pixel group according to pixel value and grid coordinate;

(iii) calculating the centroid of the difference between the pixel group; and (iv) for each pixel representation, rendering the computer-generated image according to the centroid of the difference of pixel representations.

34. The method of claim 33 further comprising the step of rendering the computer-generated image in a human user's field of view of the real-world environment in a see-through head mounted display.

35. The method of claim 33 further comprising the step of rendering the computer-generated image in a visual representation of the video image in a head mounted display.

36. The method of claim 33 further comprising the step of rendering the computer-generated image in a visual representation of the video image in a remote terminal.

37. A method for tracking an image to an object captured in a video representation of a real-world environment, comprising the step of: (a) registering the image to the object according to movement of a centroid of an interframe difference between consecutive interframe differences of sequential video frames associated with object the interframe difference based on differences between corresponding pixel representations for the object in the sequential video frames; (b) displaying the image embedded in the video representation at a remote terminal.

38. The method of claim 37, further comprising the step of: (c) displaying the image in a viewer display.

* * * * *